(12) United States Patent
Propst, Jr.

(10) Patent No.: US 6,538,755 B1
(45) Date of Patent: Mar. 25, 2003

(54) SYSTEM AND METHOD OF DETECTING THE INTERFACE BETWEEN MEDIUMS WITH DISSIMILAR INDICES OF REFRACTION

(75) Inventor: Glenn David Propst, Jr., Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/688,735

(22) Filed: Oct. 17, 2000

(51) Int. Cl.[7] ............................................. G01N 21/41
(52) U.S. Cl. ..................................... 356/635; 356/73.1
(58) Field of Search ............................... 356/73.1, 630, 356/631, 632, 635, 636, 640, 128, 133; 250/560, 559.29, 559.27, 559.28

(56) References Cited

U.S. PATENT DOCUMENTS

| | | | |
|---|---|---|---|
| 3,257,895 A | 6/1966 | Garraway | |
| 3,320,849 A | 5/1967 | Cumberland | |
| 4,362,943 A * | 12/1982 | Presby | 250/459.1 |
| 4,363,827 A | 12/1982 | Eichenbaum | |
| 4,515,475 A * | 5/1985 | Payne et al. | 356/73.1 |
| 4,519,704 A * | 5/1985 | Mansfield et al. | 356/73.1 |
| 4,744,654 A * | 5/1988 | Jinno et al. | 356/73.1 |
| 4,848,913 A | 7/1989 | Greiner | |
| 4,859,861 A | 8/1989 | Mersch | |
| 4,882,497 A * | 11/1989 | Inoue et al. | 250/560 |
| 5,054,927 A | 10/1991 | Garves | |
| 5,118,954 A * | 6/1992 | Grosso | 250/560 |
| 5,176,731 A * | 1/1993 | Prast et al. | 356/73.1 |
| 5,264,909 A * | 11/1993 | Rochester | 356/73.1 |
| 5,585,563 A | 12/1996 | Bui | |

* cited by examiner

*Primary Examiner*—Hoa Q. Pham
(74) *Attorney, Agent, or Firm*—Sughrue Mion, PLLC (57) ABSTRACT

A system and method for determining a location of an interface between media having dissimilar indices of refraction including placing a target having a contrasting pattern on a rear side of a translucent object having boundaries which define the interface between media having dissimilar indices of refraction, observing the substantially translucent object from a front side thereof with an optical observation device, determining an apparent location of the interface based on the observation of the target image through the transparent object, the apparent location differing from an actual location due to refractive displacement of light through the substantially transparent object, and calculating the actual location of the interface based on the determined apparent location.

25 Claims, 6 Drawing Sheets

ANGLED STRIPE UNDER THICK-WALLED GLASS TUBE

SYSTEM AND METHOD OF DETECTING THE INTERFACE BETWEEN MEDIUMS WITH DISSIMILAR INDICES OF REFRACTION

BACKGROUND OF THE INVENTION

1. Field of the Invention

The present invention relates to a system and method for detecting the interface between media having different indices of refraction, and more particularly, to a method of detecting the location, and hence the thicknesses and respective diameters, of the various layers of an optical fiber deposition tube or preform.

2. Discussion of Related Art

It is important to be able to identify the location of an interface or interfaces between media having different indices of refraction without contacting the media. For example, during the various stages of manufacturing an optical fiber preform (e.g., MCVD, tube collapse, etc.), it is advantageous to identify the location of the interfaces between the various layers, and particularly between a glass outer layer and an inner layer, for example, of gas, fluid, or vacuum, of a glass tube so that the concentricity and thickness of the layers can be determined as well as the overall diameter. Typically, a deposition tube, or preform, is a quartz tube used to form an optical fiber. It is important to have accurate measurements of the preform to predict the precise formation structure of the optical fiber drawn from the preform.

It is conventionally known that precise measurements may be made by hand using a contact measurement device, such as calipers. However, since the preform is often sealed at each end, a caliper may only be able to determine the outer diameter of the preform. Additionally, because the preform is often made of material such as quartz, contact measurements are undesirable as the material is susceptible to damage from the contact measurement device. Therefore, it is desirable to have a non-contact method of measuring inner and outer diameters of a preform.

There are various known non-contact techniques for measuring the thickness of a glass substrate, one requiring a laser beam and another requiring an ultrasonic pulse.

In the former technique, a laser beam is focused on the target surface using an objective lens coupled to a vibrating tuning fork producing lens vibration. As the vibrating lens moves the beam in and out of focus, the beam is continuously reflected off the target surface and back into the sensor where it is redirected by half-mirrors and converged on a pinhole aperture in front of a light receiving element. The beam only passes through the aperture when it is perfectly focused on the targets surface. At the true focal point, the peak quantity of light is detected by the light receiving element whereupon exact vertical position of the tuning fork is determined. Once the vertical position of the fork is known, the distance to the target's surface is then calculated.

Another technique using a laser beam involves the use of triangulation to determine the distance from the laser to the laser spot produced on the surface of the object to be measured.

The ultrasonic technique is described in U.S. Pat. No. 5,585,563. This technique involves sending an ultrasonic pulse through a water transmission medium into the object to be measured and measuring the time difference between the returning echoes. The time difference is correlated to the thickness of the respective layers.

However, these techniques are both expensive and complicated. For example, the laser technique involving triangulation requires two separate units to measure the outer diameter of, e.g., a fiber optic rod increasing the complexity of the setup and the overall expense. Further, the ultrasonic technique requires the presence of water as a transmission medium between the detector and the object. Since the preform is very hot in most of the processes, it cannot come in contact with water.

An object of the present invention is to provide a relatively simple and inexpensive system and method for detecting the interface between media of different refractive indices and, hence, the thicknesses and respective diameters of the various layers without contacting the media.

A further object of the invention is to provide an easy method and device for determining the concentricity of the interfaces of media having different refractive indices, the ovality of the interfaces, and a ratio of maximum and minimum points of the media, by making measurements while the media is rotated.

SUMMARY OF THE INVENTION

The present invention is directed to a simplified and inexpensive system and method for detecting the interfaces between media having different indices of refraction. According to a preferred embodiment, the method involves placing a pattern (e.g., a white diagonal line on a black background) behind the media and observing the media from the front. The interfaces in the media, through a combination of refraction and reflection, reproduce an image of the pattern which indicates the apparent location of the interfaces. The actual location can then be calculated from the apparent location. On the other hand, the actual location can be seen, as opposed to calculated, using a telecentric lens. However, due to the small size and high priced nature of telecentric lenses, this option may be somewhat limited.

According to a preferred embodiment of the invention, a system for detecting the interface between mediums with different refractive indices includes an optical observation device positioned on one side of the medium to be measured, and a target having a contrasting pattern, positioned on the opposite side thereof. The optical observation device may then record an apparent location of interfaces from which the actual locations are subsequently calculated.

According to a preferred method of the present invention, a method for indicating the interface between media with dissimilar indices of refraction includes, placing a pattern on one side of a substantially transparent object to be measured, observing the pattern through the object to be measured form an opposite side thereof, and measuring the apparent location of the interface which differs from an actual location due to the viewed location being slightly in front of the actual location, and calculating the actual location based upon the measured apparent location.

DETAILED DESCRIPTION OF THE PREFERRED EMBODIMENTS

The preferred embodiments of the invention will now be described in regard to a tube made of a substantially translucent material. While the material described in the preferred embodiments is a quartz preform for producing optical fiber, the skilled artisan will recognize that many materials may be used in application of the system and method, but are too numerous to specifically describe. Thus, the use of the claimed system and method for all substantially translucent materials having different indices of refraction are contemplated by the present inventor, and merely by way of example, the inventive system may determine interfaces between substantially translucent materials such as glass, PVC, liquids, gases, etc.

The following is an explanation of a preferred system and method for measuring the relative locations of the inner and outer surfaces of the quartz preform from which the inner and outer diameters and the wall thickness can be determined.

Figure 1:
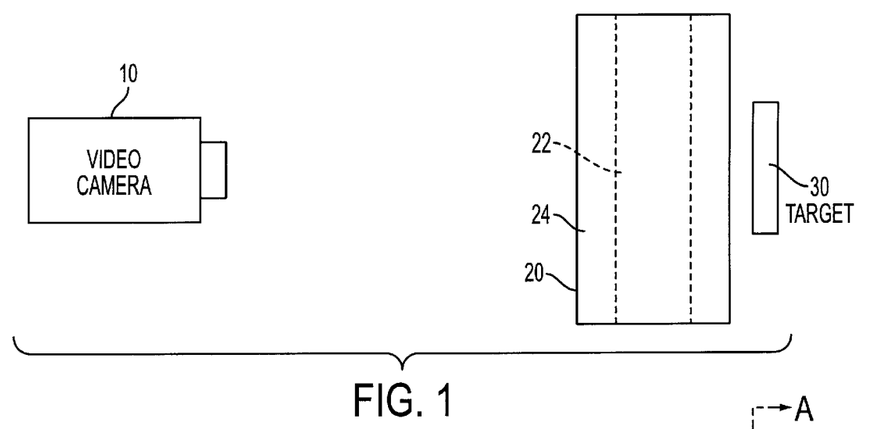
FIG. 1 illustrates a top view of a system for detecting interfaces between mediums with dissimilar indices of refraction according to an exemplary embodiment of the invention.
Figure 2:
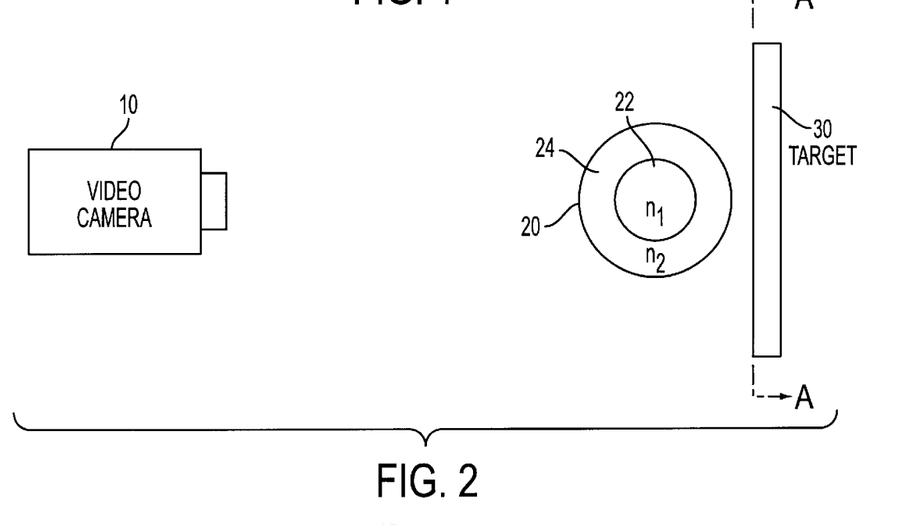
FIG. 2 illustrates a side view of the system in FIG. 1.
Figure 3:
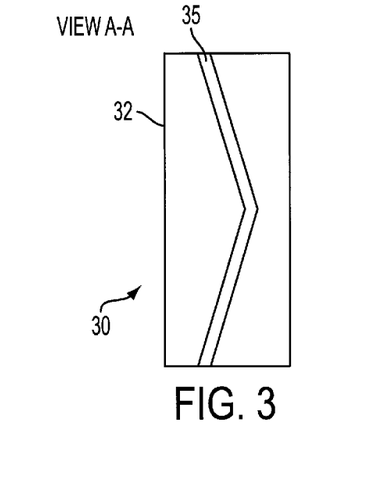
FIG. 3 illustrates an exemplary embodiment of a target used in the system of FIG. 1.

Referring to FIGS. 1–3, according to a preferred embodiment, the measuring system includes a video camera 10 provided on the front side of the preform 20 and a target 30 provided on the back side of the preform 20. The illustrated preform 20 has an inner portion and an outer portion each having different refractive indices. For example as shown in FIGS. 1 and 2, preform 20 has an inner material 22 having refractive index $n_1$, and outer material 24 having refractive index $n_2$. The inner material 22 is typically a gas, such as air, while the outer material 24 is a quartz material typically used in optical fiber production. The target 30 includes a background portion 32 and a stripe 35 as illustrated in FIG. 3. The target height should exceed the height of the preform 20. As shown, stripe 35 contrasts from the background portion 32. For example, the background portion 32 can be black and the stripe 35 white, or vice versa.

As shown in FIG. 3, the stripe 35 has a V-shape and extends from one side of the target 30 to the other. The V-shape assists in defining the edges of the virtual image observed through preform 20, which is captured by the video camera 10.

Figure 4:
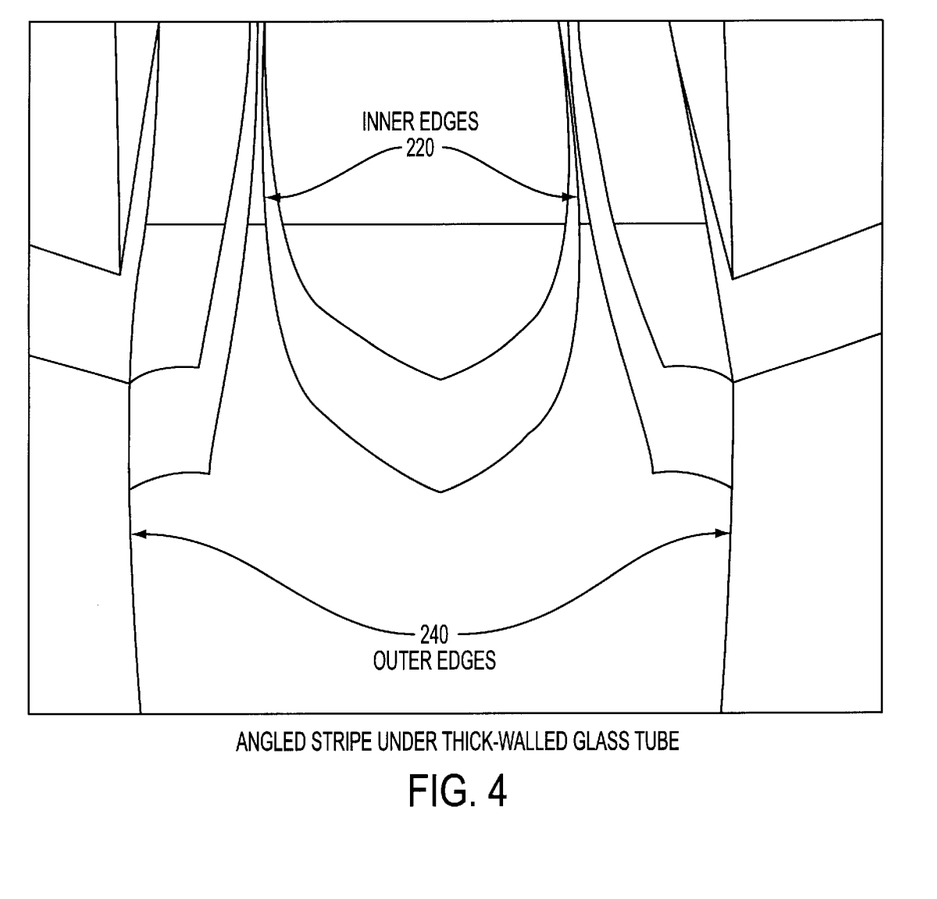
FIG. 4 illustrates an image as viewed by a camera of the system of FIG. 1.

FIG. 4 is a video image printout that shows the image of target 30 as viewed by the video camera 10 through preform 20. The stripe 35 is reflected and refracted by the preform so as to provide a distorted image of the stripe. As illustrated, the image includes distinct changes at the interfaces between the layers having different indices of refraction. Four distinct changes are shown in FIG. 4. The first two changes are located toward the center of the preform and identified as inner edges 220, corresponding to the refracted image of the target 30 as refracted by the passage of light through the preform 20 between inner material 22 with refractive index $n_1$ and outer material 24 with refractive index $n_2$.

FIG. 4 also illustrates two changes at the periphery of the tube identified as outer edges 240. The changes at the outer edges 240 result from the reflection/refraction of the light from the target 30 by the quartz outer material 24 at the periphery of the quartz outer material 24. Inner edges 220 and outer edges 240, as viewed from the camera, referred to as "apparent detection points," can be used to accurately measure the dimensions of the inner and outer materials 22 and 24 and determine the actual location of the interface between these materials, as described in detail below.

The outer diameter of the tube is measured by observing the two outermost deflections in the known target pattern caused by the outer surface of the medium to be measured. The apparent outer diameter is the distance between these two deflections. The apparent inner diameter is the distance between the two deflections that occur where light begins to reflect off the inner wall of the tube (critical angle) instead of going through and refracting.

The location of these changes can be detected by the video camera 10. In one preferred embodiment, camera 10 is a standard CCD video camera. However, camera 10 may be any type of optical observation device capable of observing electromagnetic radiation such as x-rays, infrared, ultraviolet, etc. Accordingly, the contrasting pattern on target 30 would suitably display/reflect they type of EM radiation for which the camera 10 is adapted to observe.

Knowing the respective locations of the changes (i.e., the apparent detection points) it is possible to calculate the apparent thickness of each layer by simply calculating the distance between the detected points of interest. The apparent radius of each layer may be calculated by measuring a distance between the center of the preform and the apparent detection points. Also, the concentricity of the various layers can be detected by rotating the tube or preform 20 and detecting any change in location of a particular detected point as the preform 20 is rotated. If the location of the detected point changes when the preform 20 is rotated, then the layer is not concentric with the axis of the tube. The degree of eccentricity can also be calculated by determining the distance between the two extreme points of fluctuation of the detected point upon rotation. These measurements can also be used to show the ovality/circularity of the preform; and the ratio of the maximum to the minimum diameter measured from one complete rotation.

As illustrated by the V-shaped stripe 35 in FIG. 3, it is important that the target 30 have a contrasting pattern 35 with respect to a background 32. The higher the contrast the more clearly the apparent detection points may be determined. The point of the V-shape may be aligned with the longitudinal axis of the preform (shown in FIG. 4) to assist in determining a radius of an interface.

Figure 5A:
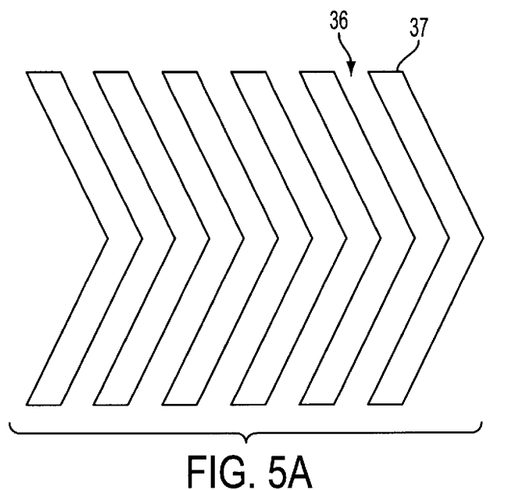
FIGS. 5A–5D illustrate various patterns for the target of the system for detecting interfaces of mediums having dissimilar refraction indices.

While a high contrast, V-shaped pattern may suffice, FIGS. 5A–5D illustrate alternative patterns for target 30. FIG. 5A illustrates a repetitive pattern having multiple V-shaped stripes alternating between white V-shaped stripes 36 and black V-shaped stripes 37. The repetitive pattern of FIG. 5A may improve the accuracy of determining the apparent location of the inner and outer radius of the object under measurement. The distances between the inner edges 220 and the outer edges 240 of FIG. 4, may be more accurately measured with the repetitive stripe pattern of FIG. 5A, because the respective measurements between inner and outer edges are made on substantially the same transverse location, rather than longitudinally separated as shown by FIG. 4.

Figure 5B:
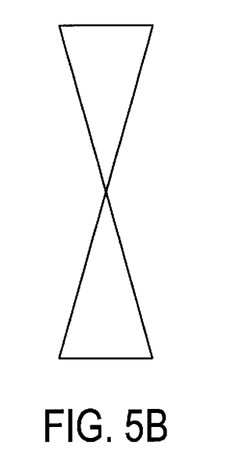

FIG. 5B illustrates an alternative contrast pattern for having an "hourglass" shape which may be used on the target for determining the location of an interface between materials having dissimilar indices of refraction. This polygonal pattern provides two deflections at each interface allowing the interpolation between the two points to find the apparent deflection point of interest. The triangular portions of the polygonal pattern help pinpoint the center of the tube.

Figure 5C:
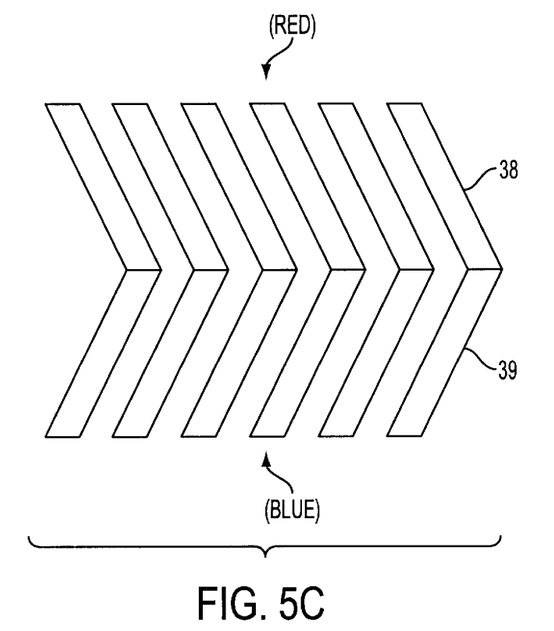
Figure 5D:
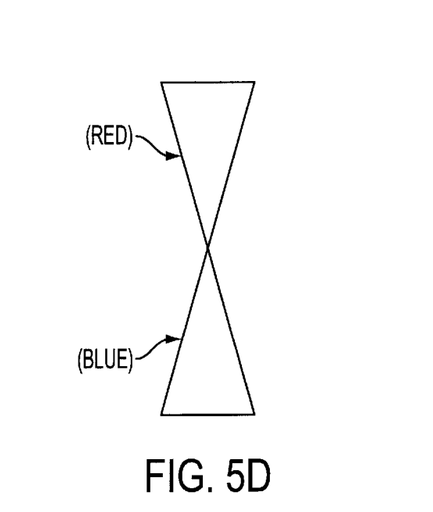

FIGS. 5C and 5D illustrate target patterns similar to 5A and 5B, except the contrast patterns of 5C and 5D utilize a colored pattern. FIG. 5C illustrates a repeating pattern having multi-color stripes with a red portion 38 and a blue portion 39. Stripes colored in this manner facilitate better understanding of the apparent image observed through the translucent object to be measured, by clearly identifying the midpoint of the V-shape (i.e., where red and blue abut each other) and the respective right and left portions of the V-shape pattern. While specific patterns and colors for target 30 have been described herein, the invention is not intended to be limited to targets having these particular features, but rather, as the skilled artisan would realize, any multitude of contrasting target patterns could be used for the present invention.

The determination of the apparent and actual location of the interface of quartz preform 20 will now be described with reference to FIGS. 6a, 6b, 7a and 7b. As discussed with respect to FIG. 4, the inner and outer edges, or virtually detected points, are observed and measured by an optical observation device, such as video camera 10. Measurement of the outer diameter of tube 20 is shown in FIG. 6A, while measurement of the inner diameter of tube 20 is illustrated in FIG. 6B.

Figure 6A:
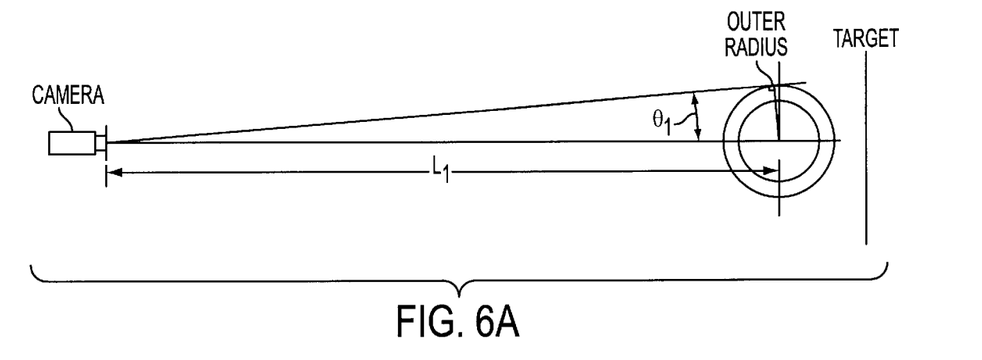
FIGS. 6A–6B illustrate respective schematic diagrams for the observance of apparent outer and inner radii of an object to be measured.
Figure 6B:
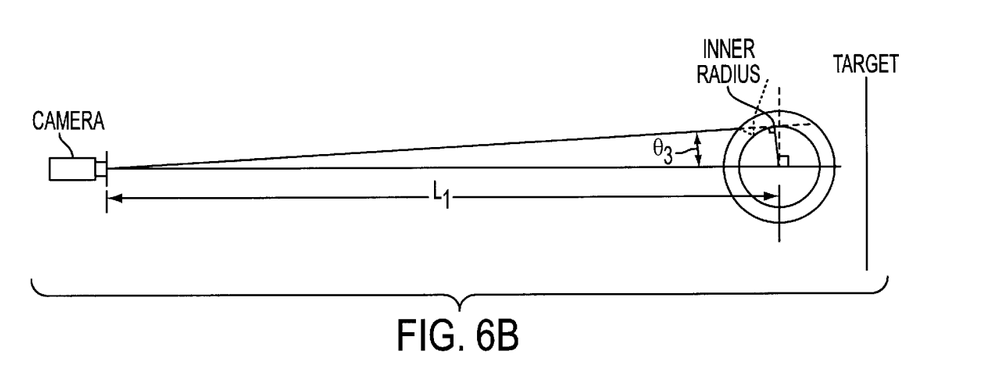

As illustrated in FIGS. 6A and 6B, $L_1$ represents the distance between the camera and the center of the medium to be measured. $L_2$ and $L_3$ represent the apparent outer radius and apparent inner radius, i.e., "apparent" as viewed by camera 10. The height h of $L_2$ and $L_3$, as seen by the observing device, are calculated by various techniques.

One technique using the video camera 10 is to count the number of pixels $N_p$ between the points of interest, i.e., apparent detection points, and calculate h by multiplying the number of pixels $N_p$ by the length of each pixel $L_p$:

$$h = N_p \times L_p$$

Of course, it is understood that the invention is not limited to this particular technique as there are many other techniques that would be satisfactory. For example, height h can be calculated by taking a picture of the virtual image using a still camera or measuring the distance using a ruler. Also, as a crude measuring technique, the distance can "eyeballed" by the user standing in front of the tube. Alternatively, target 30 may have labeled dimensions or lines which, at least for the apparent outer diameter, are easily converted from the apparent detection points to actual detection points based on the type of camera 10, (i.e., lens width, focal length, etc.) and the distance camera 10 is from the object under measurement.

Notwithstanding, the height of $L_2$, as seen by camera 10 is $h_1$, and the height of $L_3$, as seen by camera 10 is $h_2$. FIG. 7 illustrates the calculations with respect to tube 20. The focal length f of the camera is constant, and given f, $L_1$, $h_1$ and $h_2$, one may find the actual outer radius $R_1$ of tube 20 as follows:

$\theta_1 = 2 \tan^{-1}(h_1/2f)$;  (i.)

(apparent outer radius) $L_2 = L_1 \tan \theta_1$;  (ii.)

and

Outer Radius $R_1 = L_2 \cos \theta_1$  (iii.)

Additionally, the actual inner radius $R_2$ is found by:

$\theta_3 = 2 \tan^{-1}(h_2/2f)$;  (iv.)

(apparent inner radius) $L_3 = L_1 \tan \theta_3$;  (v.)

and

Inner Radius $R_2 = L_3 \cos \theta_3$  (vi.)

Figure 7A:
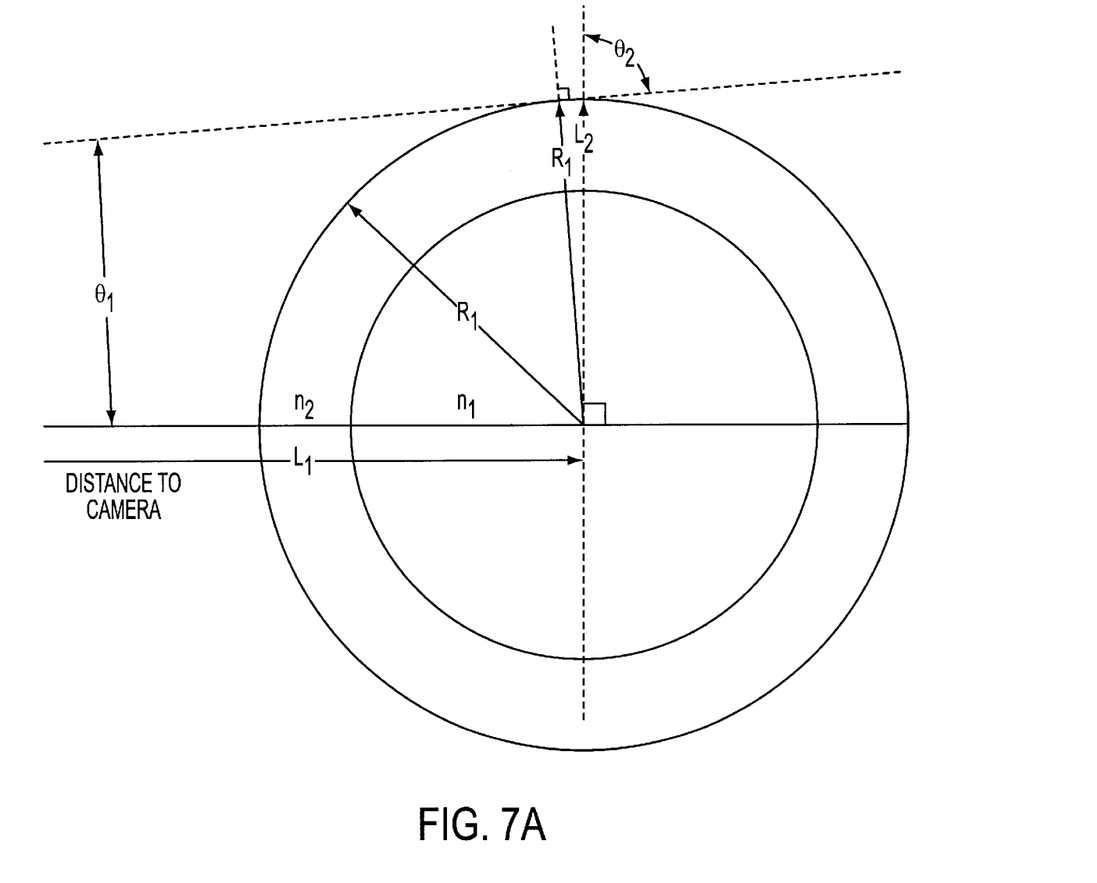
FIGS. 7A–7B illustrate an enlarged cross section of an object to be measured for the respective outer and inner diameters, and shows trigonometric relationships used in calculating an actual location from an apparent location.
Figure 7B:
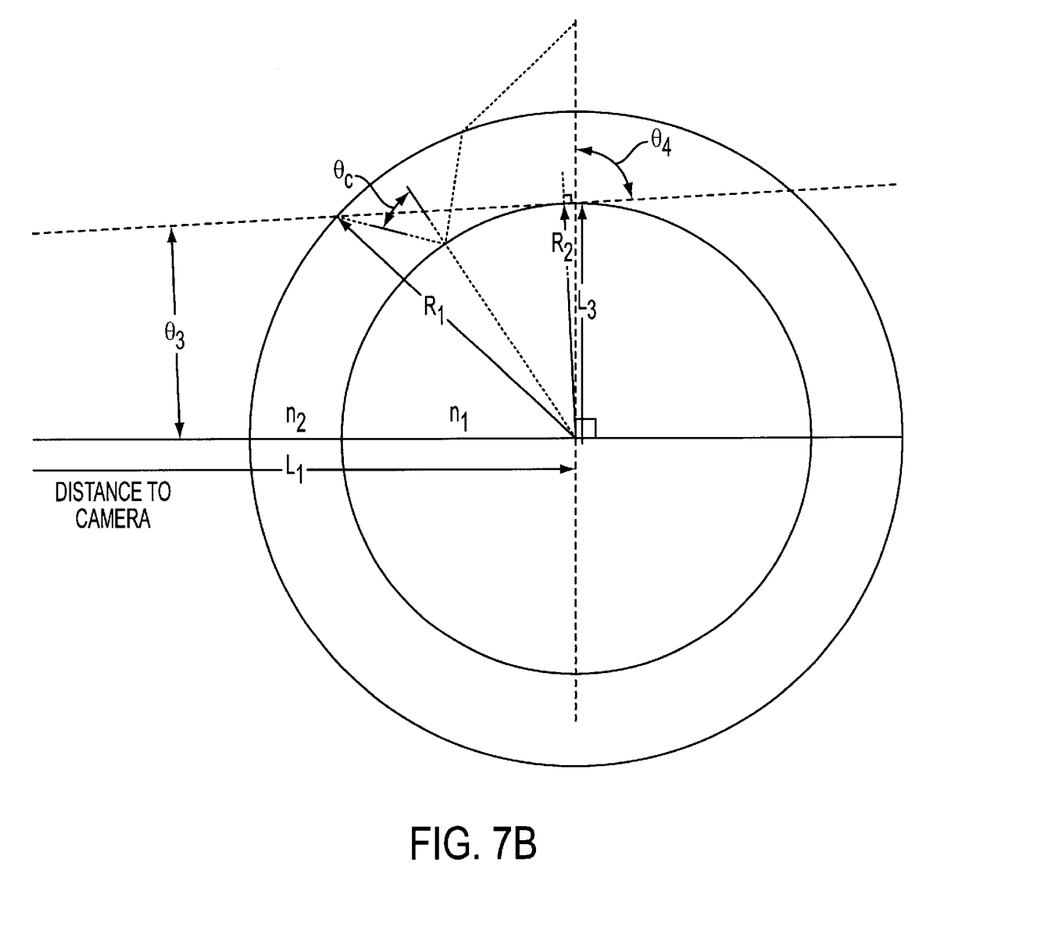

The difference between actual and apparent inner radii and between actual and apparent outer radii, as shown in FIGS. 7A and 7B, may be quite small, depending on the distance between the observing device and the material to be measured. In any event, in order to obtain an accurate measurement, even small differences must be accounted for.

Additionally, if tube 20 is rotated in front of the target 30, the concentricity and the degree of eccentricity of the tube may be observed and measured based on multiple calculations made during rotation. The calculations described above may be manually performed, implemented in software or firmware and computed using a computer, or any other known technique for performing calculations.

With the present invention, the inventor contemplates the capability of providing a fully automated system for determining the location of interfaces between preforms to determine the associated dimensions of the preform during manufacturing of optical fiber.

However, the scope of the present invention is not limited to use on optical fiber deposition tubes, but as being useful in any situations in which it is desirable to have a simple and cost effective system and method for determining locations of an interface between substantially translucent materials having dissimilar indices of refraction. Accordingly, the scope of the present invention is not intended to be limited in any manner by the foregoing detailed description, but rather the scope of the present invention should be limited solely by the appended claims.

What is claimed is:

1. A system for determining a location of an interface between media having dissimilar indices of refraction, said system comprising:

a target having a contrasting pattern disposed on one side of a substantially translucent object to be measured; and an optical observation device disposed on a side of said substantially translucent object to be measured, opposite said target, said optical observation device for observing an apparent location of said interface between said media having dissimilar indices of refraction, based on observation of said contrasting pattern, from which an actual location of said interface is determined.

2. The system for determining the location of an interface according to claim 1, wherein said optical observation device is a video camera.

3. The system for determining the location of an interface according to claim 1, wherein said contrasting pattern comprises a stripe on a background, wherein said stripe is substantially a V-shape and has a different tone with respect to said background.

4. The system for determining the location of an interface according to claim 3, wherein the tone of either said stripe or said background is white, and the other is black.

5. The system for determining the location of an interface according to claim 3, wherein said contrasting pattern is one chosen from the group consisting of multiple V-shapes, multiple U-shapes, and multiple polygonal shapes.

6. The system for determining the location of an interface according to claim 1, further comprising, a processor for calculating the actual location of said interface based upon information from said optical observation device.

7. The system for determining a location of an interface between media having dissimilar indices of refraction according to claim 1, wherein said substantially translucent object is a deposition tube for producing optical fiber.

8. A method for determining a location of an interface between media having dissimilar indices of refraction comprising:

placing a target on a rear side of a substantially translucent object having boundaries which define said interface between media having dissimilar indices of refraction;

observing said substantially translucent object from a front side thereof;

determining an apparent location of said interface based on the observation of the target as observed through said substantially transparent object; and determining an actual location of the interface based on the determined apparent location.

9. The method according to claim 8, wherein said placing of said target includes placing a contrasting pattern having a symmetrical V-shape.

10. The method according to claim 8, wherein said placing of said target includes placing a contrasting pattern having a symmetrical U-shape.

11. The method according to claim 8, wherein said placing of said target includes placing a pattern having a contrasting polygonal shape.

12. The method according to claim 8, wherein said placing of said target includes placing a pattern having one of multiple V-shapes, multiple U-shapes, or multiple polygonal shapes.

13. The method according to claim 8, wherein said observing the substantially translucent object comprises recording said substantially translucent object with a video camera.

14. The method according to claim 8, wherein said determining said apparent location comprises, detecting a plurality of apparent detection points, which are abrupt changes in a target image as observed through said substantially translucent object, and measuring a distance of at least one of said plurality of apparent detection points from one of either a different apparent detection point or a longitudinal axis of said substantially translucent object.

15. The method according to claim 14, wherein said target image is observed using a video camera.

16. The method according to claim 8, further comprising, determining a concentricity of said substantially translucent object by rotating said substantially translucent object and determining the actual location of said interface a plurality of times during rotation of said substantially translucent object.

17. The method of claim 16, further comprising, determining a degree of eccentricity of said substantially translucent object by calculating a value between a maximum and a minimum point of the plurality of actual locations determined during rotation of said substantially translucent object.

18. A method for determining an interface between media having dissimilar indices of refraction in a deposition tube for producing optical fiber, said method comprising:

positioning a target on one side of, and substantially parallel to a longitudinal axis of, said deposition tube, said deposition tube having boundaries defining said interface between media having dissimilar indices of refraction, said target having a contrasting pattern facing said deposition tube;

observing said deposition tube from a side of said deposition tube opposite said target;

determining an apparent location of said interface of said deposition tube based on observation of said contrasting pattern through said deposition tube; and determining an actual location of said interface of said deposition tube from the apparent location.

19. The method according to claim 18, wherein two interfaces are determined including a first interface which is defined by an inner circumference of said deposition tube, and a second interface which is defined by an outer circumference of said deposition tube.

20. The method according to claim 19, wherein observing said deposition tube comprises recording said deposition tube with a video camera.

21. The method according to claim 20, wherein said interfaces are determined by detecting a plurality of apparent detection points, which are abrupt changes in an image of said contrasting pattern as observed through said deposition tube, and measuring a distance between said plurality of apparent detection points.

22. The method according to claim 18, further comprising, determining a concentricity of said deposition tube by rotating said deposition tube about its longitudinal axis, determining one of said apparent or actual locations of said interface a plurality of times during deposition tube rotation, and comparing the plurality of determined locations.

23. The method according to claim 22, further comprising, determining a degree of eccentricity of the deposition tube by comparing maximum and minimum points of fluctuation between said plurality of determined locations.

24. A system for determining a location of an interface between media having dissimilar indices of refraction, said system comprising:

a target having a contrasting pattern disposed on one side of a substantially translucent object to be measured; and an optical observation device disposed on an opposite side of said substantially translucent object to be measured from said target, said optical observation device for observing an apparent location of said interface between said media having dissimilar indices of refraction, based on observation of said contrasting pattern, from which an actual location of said interface is determined.

25. A system for determining a location of an interface between media having dissimilar indices of refraction, said system comprising:

a target having a contrasting pattern; and an optical observation device, wherein:

a substantially translucent object to be measured is placed between said target and said optical observation device, and said optical observation device observes an apparent location of said interface between said media, based on observation of said contrasting pattern transmitted across said substantially translucent object, from which an actual location of said interface is determined.

* * * * *